United States Patent
Forte

(10) Patent No.: US 6,367,428 B1
(45) Date of Patent: Apr. 9, 2002

(54) COMBINATION DOG COLLAR AND LEASH SYSTEM

(76) Inventor: Michael E. Forte, 11925 Dietz Dr., Tampa, FL (US) 33626

( * ) Notice: Subject to any disclaimer, the term of this patent is extended or adjusted under 35 U.S.C. 154(b) by 0 days.

(21) Appl. No.: 09/613,909

(22) Filed: Jul. 11, 2000

Related U.S. Application Data

(63) Continuation-in-part of application No. 29/101,173, filed on Feb. 26, 1999, now abandoned.

(51) Int. Cl.[7] ............................................. A01K 27/00
(52) U.S. Cl. ..................................................... 119/863
(58) Field of Search ................................ 119/856, 863, 119/864, 865, 769, 792, 793, 795, 797, 798

(56) References Cited

U.S. PATENT DOCUMENTS

| | | | |
|---|---|---|---|
| 4,584,967 A | * | 4/1986 | Taplin |
| 5,099,799 A | * | 3/1992 | Giacobbe |
| 5,297,514 A | * | 3/1994 | Stout et al. .................. 119/863 |
| 5,785,010 A | * | 7/1998 | Koch .......................... 119/863 |
| 5,947,062 A | * | 9/1999 | Hoffman et al. ............ 119/769 |
| 6,016,772 A | * | 1/2000 | Noyes ......................... 119/863 |
| 6,129,055 A | * | 10/2000 | Hanada ....................... 119/863 |

* cited by examiner

Primary Examiner—Thomas Price

(57) ABSTRACT

A combination dog collar and leash system. A strap has a length with a midpoint and with an interior surface and an exterior surface and an inner end and an outer end. The outer end is folded to form a first loop constituting a handle with a first stitching at the outer end forming a leash. The inner end is folded to form an overlapping extent with a second stitching at the inner end. A first segment of a pile type fastener is secured to the strap from adjacent to the outer end along the length of the handle. A second segment of a pile type fastener is secured to the exterior surface from adjacent to the inner end. A portion of a plastic buckle is secured in the second loop. A portion of a plastic buckle is slidably secured to the strap adjacent to the center of the strap.

3 Claims, 3 Drawing Sheets

COMBINATION DOG COLLAR AND LEASH SYSTEM

RELATED APPLICATION

This application is a continuation-in-part application of co-pending U.S. patent application Ser. No. 29/101,173 filed Feb. 26, 1999, now abandoned.

BACKGROUND OF THE INVENTION

1. Field of the Invention

The present invention relates to a combination dog collar and leash system and more particularly pertains to improving dog safety and/or control and/or convenience.

2. Description of the Prior Art

The use of dog collars and leash systems of known designs and configurations is known in the prior art. More specifically, dog collars and leash systems of known designs and configurations previously devised and utilized for the purpose increasing dog safety, control and convenience are known to consist basically of familiar, expected, and obvious structural configurations, notwithstanding the myriad of designs encompassed by the crowded prior art which has been developed for the fulfillment of countless objectives and requirements.

By way of example, U.S. Pat. No. Des. 359,598 to Forbes discloses a combined collar and handle. Further, U.S. Pat. No. 5,497,733 to Hull discloses an animal control, training apparatus and method of use. More specifically, the patent to Forbes discloses a combined collar and handle wherein the handle is coupled directly to the collar at a fixed point and provides for no adjustability or leash while adjustability of the collar is effected through a supplemental sliding buckle which forms a discontinuity in that portion of the collar contacting the neck of the dog. The Hull patent relates to a choker type collar and not a collar of a fixed circumference which may be modified at the discretion of the user and with an extended length of a leash with no real loop type handle.

While these devices fulfill their respective, particular objectives and requirements, the aforementioned patents do not describe a combination dog collar and leash system that allows improving dog safety and/or control and/or convenience.

In this respect, the combination dog collar and leash system according to the present invention substantially departs from the conventional concepts and designs of the prior art, and in doing so provides an apparatus primarily developed for the purpose of improving dog safety and/or control and/or convenience.

Therefore, it can be appreciated that there exists a continuing need for a new and improved combination dog collar and leash system which can be used for improving dog safety and/or control and/or convenience. In this regard, the present invention substantially fulfills this need.

SUMMARY OF THE INVENTION

In view of the foregoing disadvantages inherent in the known types of dog collars and leash systems of known designs and configurations now present in the prior art, the present invention provides an improved combination dog collar and leash system. As such, the general purpose of the present invention, which will be described subsequently in greater detail, is to provide a new and improved combination dog collar and leash system and method which has all the advantages of the prior art and none of the disadvantages.

To attain this, the present invention essentially comprises combination dog collar and leash system for increased dog safety, control, and convenience. A strap of a rib-stock nylon strapping is first provided. The strap has a length of about 44.5 inches. The strap also has a midpoint. The strap further has an interior surface and an exterior surface and an inner end and an outer end. The strap has a height of about 1 inch. The outer end of the strap is folded upon itself with the interior surface in facing engagement to form a first overlapping extent. The first overlapping extent is a first loop constituting a handle of about 7 inches. A first box stitching is next provided at the outer end for securement purposes thereby forming a single ply of a loop constituting a leash between the handle and a point adjacent to the midpoint. The inner end is folded upon itself with the exterior surface in facing engagement to form an overlapping extent of about 2.7 inches. A second box stitching is provided at the inner end for securement purposes. A line of stitching parallel with the end edge is provided to form a small second loop and, there adjacent, a small third loop. The third loop is closer to the midpoint than the second loop. A first segment of a pile type fastener is next provided. The first segment has a length of about 7 inches secured to the strap from adjacent to the outer end along the length of the entire handle on the interior surface. A second segment of a pile type fastener is next provided. The second segment has a length of about 7 inches secured to the exterior surface from adjacent to the inner end at the second box stitching toward the midpoint. The segments of pile type fastener are releasably coupled when no handle and leash are needed but to be separated when a leash and a handle are needed. A plastic coated metal welded D-ring is secured to the strap in the third loop. Next provided is a female portion of a plastic buckle with an attachment rod secured to the second loop. Lastly provided is a male portion of a plastic buckle. The male portion of the buckle has a generally rectangular opening. The male portion of the buckle also has a central post slidably secured to the strap adjacent to the center of the strap for adjusting the circumference of the collar when the buckle portions are coupled and for thereby varying the length of the leash. The handle is of a fixed length. The circumference of the collar varies from between about 18 inches and 21 inches, thereby constituting between about 40.4 percent and 47.0 percent of the length of the strap.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved combination dog collar and leash system which has all of the advantages of the prior art dog collars and leash systems of known designs and configurations and none of the disadvantages.

It is another object of the present invention to provide a new and improved combination dog collar and leash system which may be easily and efficiently manufactured and marketed.

It is further object of the present invention to provide a new and improved combination dog collar and leash system which is of durable and reliable constructions.

An even further object of the present invention is to provide a new and improved combination dog collar and leash system which is susceptible of a low cost of manufacture with regard to both materials and labor, and which accordingly is then susceptible of low prices of sale to the consuming public, thereby making such combination dog collar and leash system economically available to the buying public.

Even still another object of the present invention is to provide a combination dog collar and leash system for improving dog safety and/or control and/or convenience.

Lastly, it is an object of the present invention to provide a new and improved combination dog collar and leash system. A strap has a length with a midpoint and with an interior surface and an exterior surface and an inner end and an outer end. The outer end is folded to form a first loop constituting a handle with a first stitching at the outer end forming a leash. The inner end is folded to form an overlapping extent with a second stitching at the inner end. A first segment of a pile type fastener is secured to the strap from adjacent to the outer end along the length of the handle. A second segment of a pile type fastener is secured to the exterior surface from adjacent to the inner end. A portion of a plastic buckle is secured in the second loop. A portion of a plastic buckle is slidably secured to the strap adjacent to the center of the strap.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
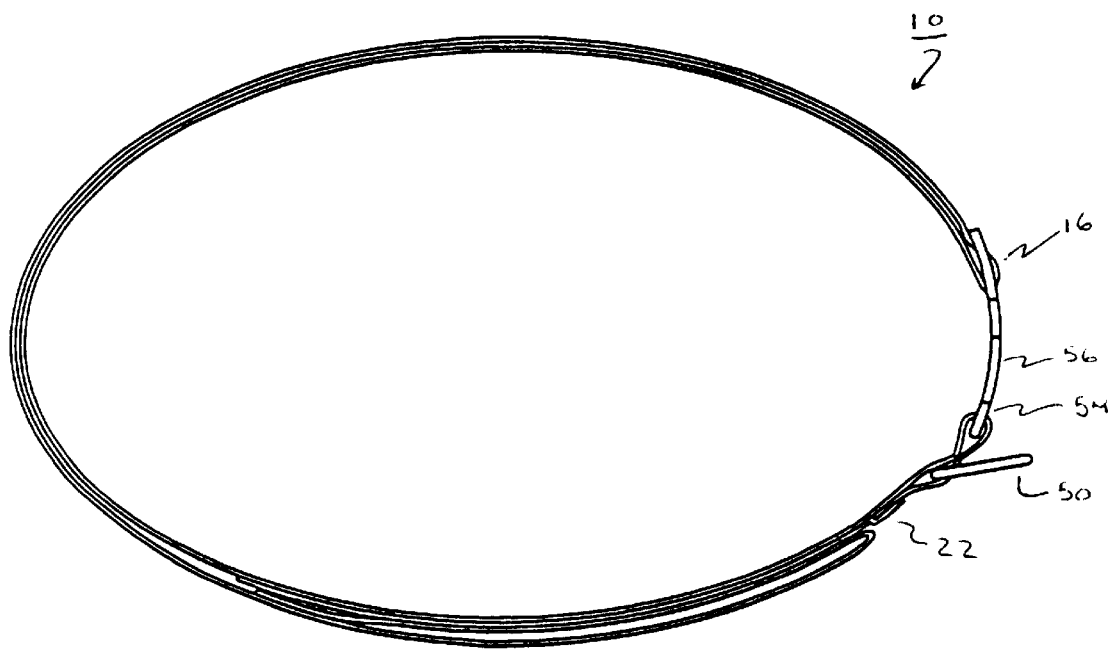
FIG. 1 is a top plan view of the combination collar and leash system constructed in accordance with the principles of the present invention shown in a collar-like configuration.
Figure 2:
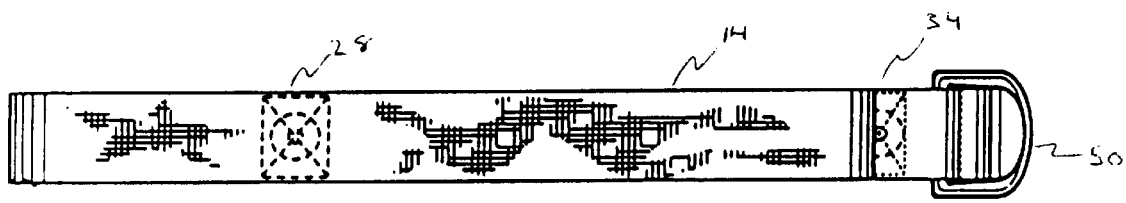
FIG. 2 is a front elevational view thereof.
Figure 3:
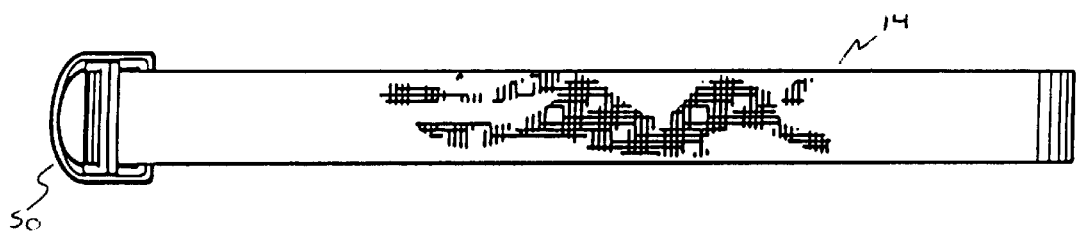
FIG. 3 is a rear elevational view thereof.
Figure 4:
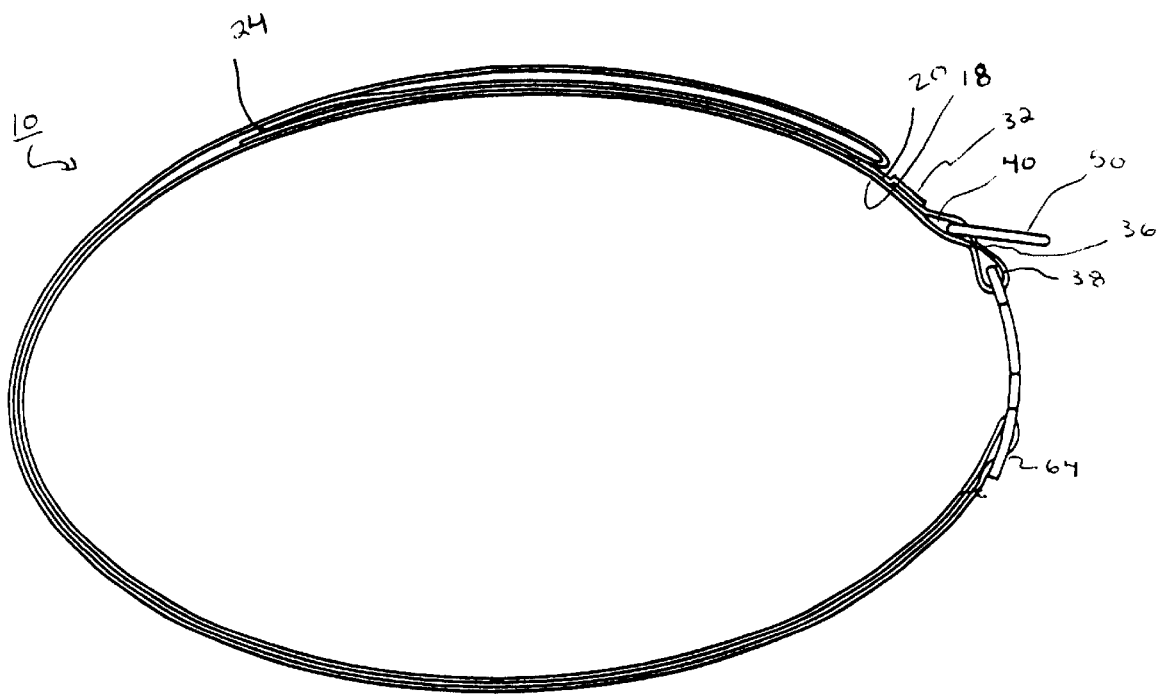
FIG. 4 is a bottom plan view thereof.
Figure 5:
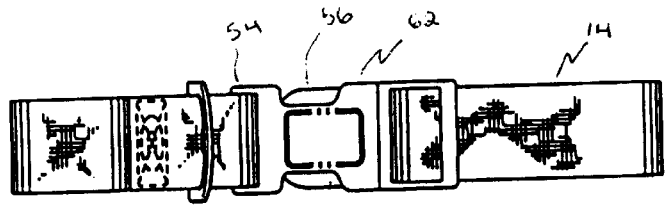
FIG. 5 is a left side elevational view thereof.
Figure 6:
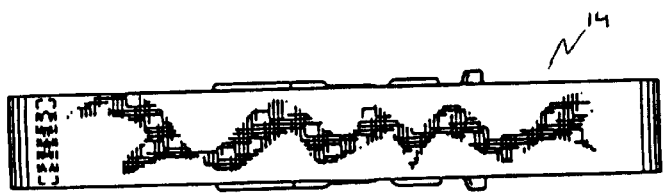
FIG. 6 is a right side elevational view thereof.
Figure 7:
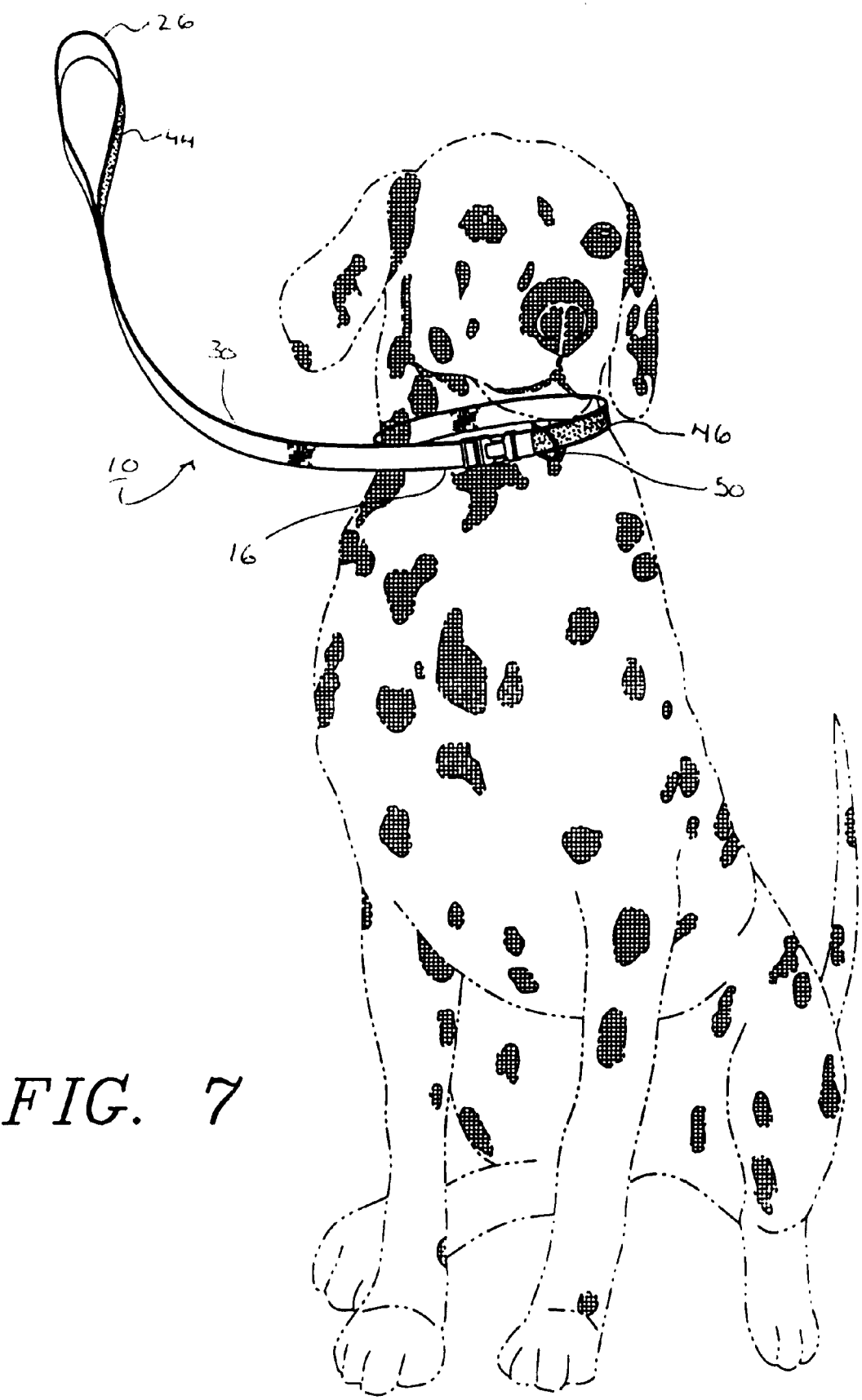
FIG. 7 is a perspective illustration of the system depicting a leash-like configuration on a dog.

With reference now to the drawings, and in particular to FIG. 1 thereof, the preferred embodiment of the new and improved combination dog collar and leash system embodying the principles and concepts of the present invention and generally designated by the reference numeral 10 will be described.

The present invention, the combination dog collar and leash system 10 is comprised of a plurality of components. Such components in their broadest context include a strap, first and second segments of a pile type fastener, and two portions of a plastic buckle. Such components are individually configured and correlated with respect to each other so as to attain the desired objective.

A strap 14 of a rib-stock nylon strapping is first provided. The strap has a length of about 44.5 inches. The strap also has a midpoint 16. The strap further has an interior surface 18 and an exterior surface 20 and an inner end 22 and an outer end 24. The strap has a height of about 1 inch. The outer end of the strap is folded upon itself with the interior surface in facing engagement to form a first overlapping extent. The first overlapping extent is a first loop constituting a handle 26 of about 7 inches. A first box stitching 28 is next provided at the outer end for securement purposes thereby forming a single ply of a loop constituting a leash 30 between the handle and a point adjacent to the midpoint. The inner end is folded upon itself with the exterior surface in facing engagement to form an overlapping extent 32 of about 2.7 inches. A second box stitching 34 is provided at the inner end for securement purposes. A line of stitching 36 parallel with the end edge is provided to form a small second loop 38 and, there adjacent, a small third loop 40. The third loop is closer to the midpoint than the second loop.

A first segment 44 of a pile type fastener is next provided. The first segment has a length of about 7 inches secured to the strap from adjacent to the outer end along the length of the entire handle on the interior surface.

A second segment 46 of a pile type fastener is next provided. The second segment has a length of about 7 inches secured to the exterior surface from adjacent to the inner end at the second box stitching toward the midpoint. The segments of pile type fastener are releasably coupled when no handle and leash are needed but to be separated when a leash and a handle are needed.

A plastic coated metal welded D-ring 50 is secured to the strap in the third loop.

Next provided is a female portion 54 of a plastic buckle 56 with an attachment rod 58 secured to the second loop.

Lastly provided is a male portion 62 of a plastic buckle 56. The male portion of the buckle has a generally rectangular opening. The male portion of the buckle also has a central post 64 slidably secured to the strap adjacent to the center of the strap for adjusting the circumference of the collar when the buckle portions are coupled and for thereby varying the length of the leash. The handle is of a fixed length. The circumference of the collar varies from between about 18 inches and 21 inches, thereby constituting between about 40.4 percent and 47.0 percent of the length of the strap.

As to the manner of usage and operation of the present invention, the same should be apparent from the above description. Accordingly, no further discussion relating to the manner of usage and operation will be provided.

The preferred total strap lengths and collar circumferences for dogs with various neck sizes, all in inches, and percentages of the circumference to strap lengths are as follows:

| Strap Length | Circumference Minimum (%) | Circumference Maximum (%) |
|---|---|---|
| 40 | 15 (37.5) | 18 (45) |
| 44.5 | 18 (40.4) | 21 (47) |
| 51 | 21 (41) | 24 (47) |
| 57 | 24 (42) | 27 (47) |
| 60 | 26 (43) | 29 (48) |
| 68 | 30 (44) | 34 (50) |

While the present invention has a strap with a preferred height of 1 inch, a wide variety of widths may be readily utilized with 0.75 inches being a preferred alternative.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A combination dog collar and leash system for increased dog safety, control, and convenience comprising, in combination:

a strap of a rib-stock nylon strapping having a length of about 44.5 inches with a midpoint and with an interior surface and an exterior surface and an inner end and an outer end with a height of about 1 inch, the outer end being folded upon itself with the interior surface in facing engagement to form a first overlapping extent which is a first loop constituting a handle of about 7 inches with a first box stitching at the outer end for securement purposes thereby forming a single ply of a loop constituting a leash between the handle and a point adjacent to the midpoint, the inner end being folded upon itself with the exterior surface in facing engagement to form an overlapping extent of about 2.7 inches and with a second box stitching at the inner end for securement purposes, and with a line of stitching parallel with the end edge to form a small second loop and, there adjacent, a small third loop, the third loop being closer to the midpoint than the second loop;

a first segment of a pile type fastener having a length of about 7 inches secured to the strap from adjacent to the outer end along the length of the entire handle on the exterior surface of the strap;

a second segment of a pile type fastener having a length of about 7 inches secured to the exterior surface of the strap from adjacent to the inner end at the second box stitching toward the midpoint, the segments of pile type fastener being releasably coupled when no handle and leash are needed but to be separated when a leash and a handle are needed;

a plastic coated metal welded D-ring secured to the strap in the third loop;

a female portion of a plastic buckle with an attachment rod secured to the second loop; and a male portion of a plastic buckle with a generally rectangular opening and a central post slidably secured to the strap adjacent to the center of the strap for adjusting the circumference of the collar when the buckle portions are coupled and for thereby varying the length of the leash, the handle being of a fixed length and the circumference of the collar varying from between about 18 inches and 21 inches, thereby constituting between about 40.4 percent and 47.0 percent of the length of the strap.

2. A combination dog collar and leash system comprising:

a strap having a length with a midpoint and with an interior surface and an exterior surface and an inner end and an outer end, the outer end being folded to form a first loop constituting a handle with a first stitching at the outer end thereby forming a leash, the inner end being folded to form an overlapping extent with a second stitching at the inner end;

a first segment of a pile type fastener secured to the exterior surface of the strap from adjacent to the outer end along the length of the handle;

a second segment of a pile type fastener secured to the exterior surface of the strap from adjacent to the inner end the interior surface of the strap being devoid of a pile type fastener;

a first portion of a plastic buckle secured in the second loop; and a second portion of a plastic buckle slidably secured to the strap adjacent to the center of the strap the first and second portions of the buckle couplable together to form a collar and the circumference of the collar being between about 37.5 percent and 50.0 percent of the length of the strap.

3. The system as set forth in claim 2 and further including a plastic coated D-ring secured to the strap.

* * * * *